United States Patent [19]

Gross et al.

[11] Patent Number: 5,066,317
[45] Date of Patent: Nov. 19, 1991

[54] COMPRESSED GAS DRYER SYSTEM WITH PRESSURE RETENTION

[75] Inventors: Dario Gross, Corunna; Roger L. Sweet, Fowlerville, both of Mich.

[73] Assignee: Midland Brake, Inc., Kansas City, Mo.

[21] Appl. No.: 451,222

[22] Filed: Dec. 15, 1989

[51] Int. Cl.⁵ .......................................... B01D 46/00
[52] U.S. Cl. ........................................ 55/218; 55/303; 55/316; 55/387
[58] Field of Search ................... 55/218, 302, 316, 303, 55/387, 218, 389; 60/590 A, 39.41; 417/364

[56] References Cited

U.S. PATENT DOCUMENTS

| | | | |
|---|---|---|---|
| 3,592,563 | 7/1971 | Glass et al. | 55/302 |
| 3,822,831 | 9/1974 | Ritchie et al. | 55/218 |
| 3,923,479 | 12/1975 | Glass et al. | 55/218 |
| 4,026,685 | 5/1977 | Grix | 55/316 |
| 4,029,486 | 6/1977 | Frantz | 55/316 |
| 4,519,819 | 5/1985 | Frantz | 55/218 |
| 4,544,385 | 10/1985 | Tanaka | 55/316 |
| 4,652,216 | 3/1987 | Eslinger et al. | 417/364 |
| 4,714,483 | 12/1987 | Koening et al. | 55/387 |
| 4,892,569 | 1/1990 | Kojima | 55/218 |

Primary Examiner—Bernard Nozick
Attorney, Agent, or Firm—Neuman, Williams, Anderson & Olson

[57] ABSTRACT

In its broad aspect, the present invention involves a governor-controlled gas compressor system for maintaining gas pressure in a gas reservoir between a predetermined first pressure level at which said compressor commences to compress pressurized intake gas from a supercharged source thereof and a predetermined higher second pressure level at which the compressor ceases to compress said gas. The system includes a gas dryer vessel intermediate said compressor and said reservoir to effect drying of the compressed gas. The gas dryer is provided with means for exhausting purge gas therefrom only when the pressure of the purge gas exceeds the pressure of the pressurized intake gas from the supercharged source thereof.

4 Claims, 3 Drawing Sheets

COMPRESSED GAS DRYER SYSTEM WITH PRESSURE RETENTION

This invention relates to improvements in pneumatic braking systems. More particularly, the invention relates to improvements in pneumatic braking systems utilized with vehicles equipped with a turbocharged or supercharged internal combustion engine, which improvements make possible use of an air dryer in such systems without detrimental loss in engine power.

BACKGROUND OF THE INVENTION

As is well known, heavy duty road vehicles, such as trailer tractors, employ compressed air brake systems. Such heavy duty vehicles are commonly equipped with a turbocharged or supercharged internal combustion engine and the pneumatic brake system obtains its supply of air from the air intake manifold of the vehicle engine where the air is already at superatmospheric pressure, say 25 psig, as a result of supercharging. Such pneumatic or air braking systems generally involve an air compressor operable in normal or unloading modes, a governor for controlling the operating cycle of the air compressor, an air dryer and a reservoir for holding pressurized air for delivery to the vehicle brakes.

When the pressure in the air reservoir falls below a predetermined minimum pressure, say about 100 psig, the compressor governor then causes the air compressor to operate in a normal or loading mode to compress air. The compressed air from the air compressor during its normal or compressing cycle is passed through an air dryer to remove moisture and then into the air brake reservoir or reservoirs. When the desired pressure, say about 120 psig, is attained in the pressurized air reservoir, the compressor governor functions to cause the air compressor to unload (unloading mode). When the compressor operates in the unloading mode and without the improvement of the present invention, the intake air from the vehicle engine manifold passes through the compressor, but is not compressed therein. It then passes through the air dryer and is then discharged into the atmosphere via an air dryer purge valve. The free or unrestricted flow of intake air from the engine manifold through the compressor and air dryer during the compressor unloading cycle is wasteful and results in a loss of engine power and efficiency. This is particularly significant if the intake air from the vehicle engine manifold is under pressure as is the case with turbocharged or supercharged engines.

OBJECTS OF THE INVENTION

It is therefore a general object of this invention to provide improvements in pneumatic braking systems whereby the power and efficiency of vehicle engines are not impaired by operation of the pneumatic braking system.

It is another object of this invention to provide an improved governor controlled gas compressor system.

It is another object of this invention to provide improvements in a pneumatic braking system which utilizes supercharged air from the air intake manifold of a vehicle internal combustion engine.

It is still another object of this invention to provide means in a pneumatic braking system for restricting the flow of air from the engine intake manifold via the brake system air compressor to the atmosphere during the unloading cycle of the air compressor.

It is still another object of this invention to allow use of the brake system air dryer when the brake system air compressor is supercharged by engine manifold pressure.

It is a specific object of this invention to accomplish the previous object by adding a pressure retention feature in the purge valve of the air dryer.

It is still another specific object to add the pressure retention feature at nominal cost and without substantial redesign of the air dryer or purge valve.

These and other objects will be apparent as the detailed description proceeds.

SUMMARY OF THE INVENTION

In its broad aspect, the present invention involves a governor-controlled gas compressor system for maintaining gas pressure in a gas reservoir between a predetermined first pressure level at which said compressor commences to compress pressurized intake gas from a supercharged source thereof and a predetermined higher second pressure level at which the compressor ceases to compress said gas. The system includes a gas dryer vessel intermediate said compressor and said reservoir to effect drying of the compressed gas. The gas dryer is provided with means for exhausting purge gas therefrom only when the pressure of the purge gas exceeds the pressure of the pressurized intake gas from the supercharged source thereof.

In one preferred and important application, the invention relates to a governor-controlled pneumatic braking system for use with vehicles equipped with a supercharged or turbocharged internal combustion engine which supplies supercharged air to the braking system from the engine manifold. In one specific embodiment, the present invention provides a purge valve for use with a gas dryer in a compressed gas system, which valve functions to exhaust purge gas from the dryer only to the extent that the purge gas exceeds a predetermined superatmospheric pressure.

DESCRIPTION OF PREFERRED EMBODIMENTS OF THE INVENTION

Figure 1:
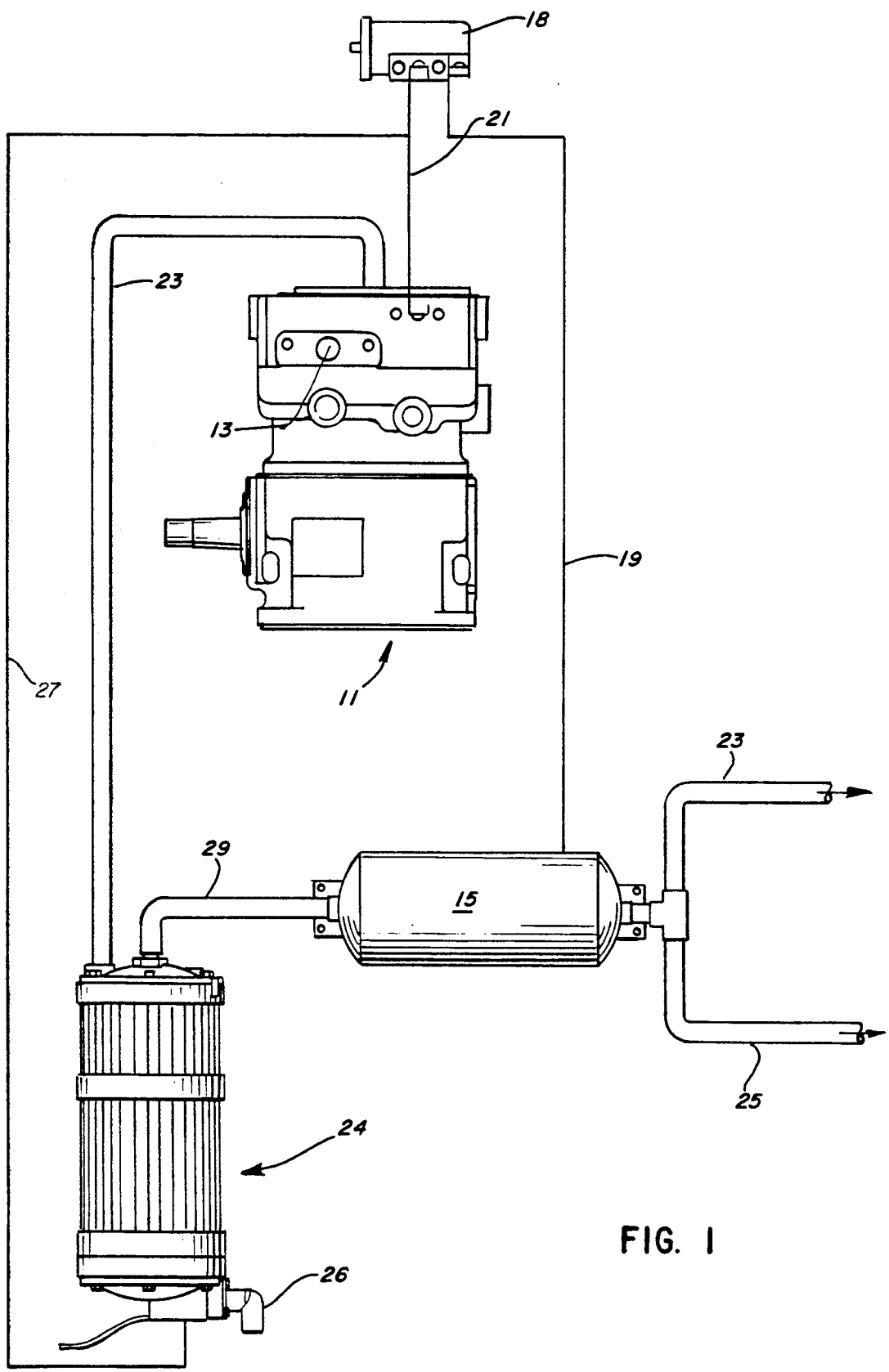
FIG. 1 relates to a preferred embodiment of the invention and illustrates schematically the arrangement and operation of a governor-controlled air compressor, air dryer and a pressurized air reservoir as in a typical compressed air brake system for vehicles.

Referring to FIG. 1 of the drawings, an air compressor 11 of known type is adapted to receive through port 13 superatmospheric air from a turbocharged internal combustion engine (not shown). The size and capacity of the air compressor 11 will depend upon the operational demands imposed thereon. The air compressor, as is usual, operates in both a loading (compressing) and an unloading (non-compressing) mode. When the air pressure in reservoir 15 falls below a predetermined minimum, say 100 psig, the compressor governor 18 causes the air compressor to compress air, i.e. operate in the loading cycle or mode. Signal line 19 provides communication between the air reservoir 15 and governor 18 and is continuously charged with air which is at the same pressure as the air in reservoir 15. By virtue of this communication the compressor governor 18 causes the compressor 11 to operate in either the loading or unloading mode depending upon the air pressure in the reservoir 15.

The compressor governor 18 is of conventional design and may be preset to respond to certain operating premises of the brake system with which it is associated. Air line 21 connects the governor 18 with the compressor 11 whereby, depending on the pressure in the system, the compressor is caused to operate in either the loading (normal) mode or the unloading mode. Operation of an air compressor by a governor is well known and widely practiced in the pneumatic braking art, for example. For a more detailed description as to the operation of an air compressor as controlled by a governor in an air braking system, see, for example, U.S. Pat. No. 4,710,108, the disclosure of which is incorporated herein.

In a typical conventional air braking system compressed air from compressor 11 passes through air line 23 to air dryer 24, which removes water and possibly other contaminants therefrom. The dried compressed air from air dryer 24 is then passed via line 29 to the air reservoir 15 so as to maintain the desired air pressure therein for delivery to the air brakes of a vehicle through lines 23 and 25. When the air pressure within the reservoir 15 reaches the required minimum pressure, the compressor governor causes the air compressor to switch to the unloading cycle. During the unloading cycle, the intake air from the vehicle engine passes freely through the compressor without being compressed and then to the air dryer. During the unloading cycle purge air within the air dryer purges water therefrom and is discharged to the atmosphere through purge valve 26. Pneumatic pressure transmitted through line 27 controls the operation of purge valve 26.

Figure 2:
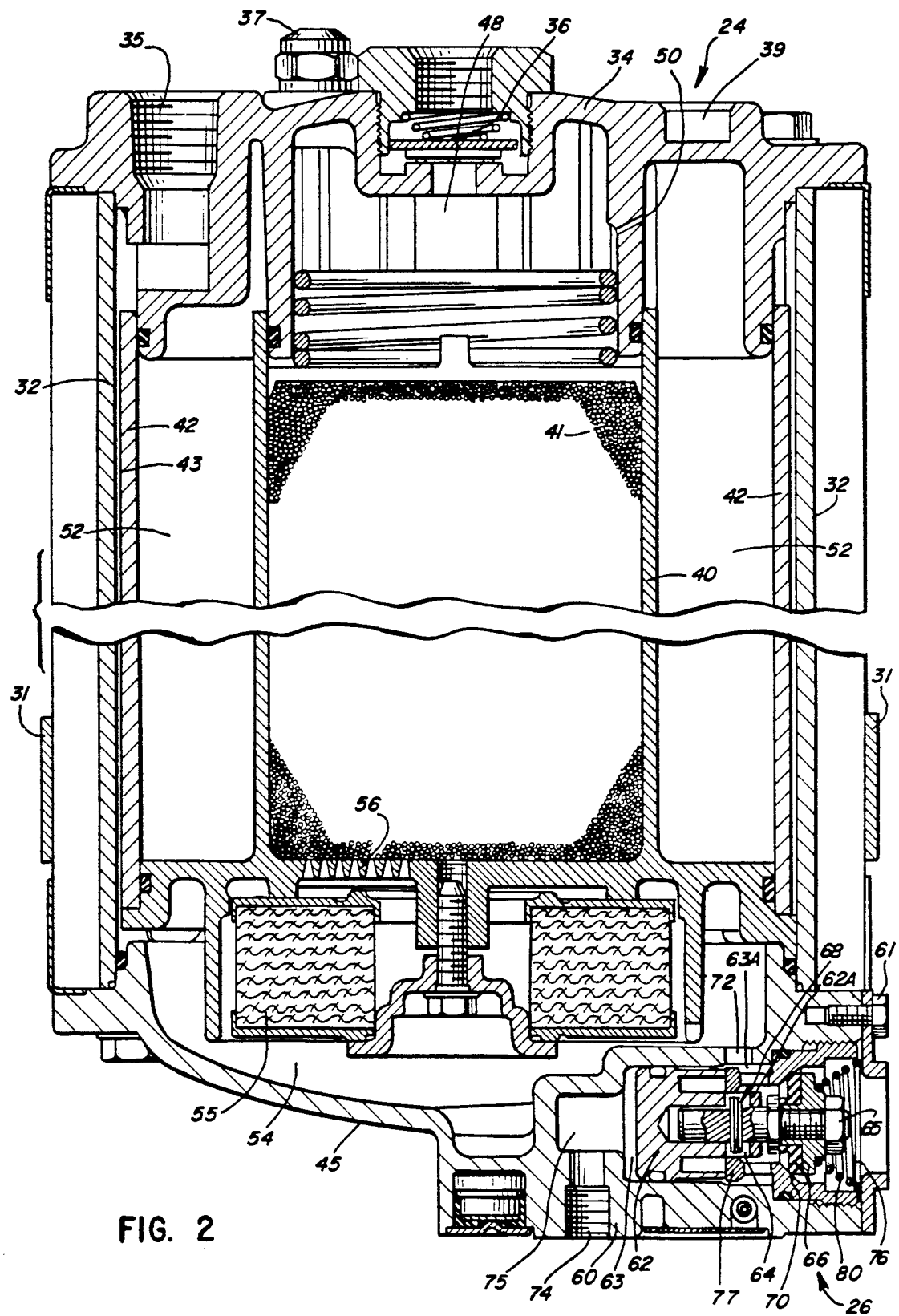
FIG. 2 is a view in cross-section of a typical air dryer provided with an air purge valve in accordance with one preferred embodiment of the invention.

FIG. 2 shows a typical air dryer of conventional design provided with a purge valve in accordance with this invention. Thus, referring to FIG. 2, the numeral 24 generally designates an air dryer of conventional design which is usually cylindrical in shape and which can be mounted in the braking system either horizontally or vertically by means of adjustable mounting brackets 31. As is typical, the air dryer 24 has an outer housing 32 formed of a lightweight metal such as aluminum. Top closure cover 34 is provided with air intake port 35 through which compressed air from the air compressor 11 is received via air delivery line 23 as shown in FIG. 1. Top closure 34 is also provided with a one-way check valve 36 through which pressurized dry air leaves the dryer and passes through air line 29 to the air reservoir 15, also shown in FIG. 1. Preferably, a pressure relief valve 37 is provided in the top cover of the air dryer which may also include, if desired, an additional port 39 whereby additional purge air can be introduced into the air dryer if necessary or desired.

Centrally located within the dryer is a generally cylindrical elongated drying chamber 40 which is packed with a dessicant material 41 such as sodium aluminosilicate (molecular sieve) and the like. A convex bottom 45 seals the air dryer. A purge valve 26 in accordance with the invention is located in the bottom portion of the dryer.

An air plenum chamber 48 is located above the drying chamber 40 and a relatively narrow, say 0.060 inch diameter, inclined passageway 50 provides communication between the plenum 48 and an elongated annular purge air chamber 52.

Closely spaced from the outer housing 32 is an inner shell 42 to provide air passageway 43 through which flows air from compressor 11 during the normal or compressing mode of the compressor. The compressed gas is cooled during flow through the elongated air passageway 43 by virtue of extended surface contact with the walls defining the passageway.

Compressed air from the compressor enters port 35 and flows downwardly through air passageway 43. Air passage 43 is a narrow elongated passage and provides a large gas contact area to effect cooling of the compressed gas. The compressed air flowing downwardly through passageway 43 enters sump 54 and then flows upwardly through a filter element 55 which can, for example, be a pleated polyester filter. The compressed air then passes upwardly through openings 56 and upwardly through the desiccant chamber 40 wherein moisture is removed therefrom. A portion of the compressed air flows through the inclined passageway 50 and enters air purge chamber 52. The greater portion of the compressed air flows through one-way check valve 36 and through line 29 to air reservoir 15 during the loading cycle of the compressor. The check valve 36 is closed during the purge cycle of the compressor and retains the pressurized air in air reservoirs.

When the air pressure in the air reservoir is at a satisfactory pressure, say 120 psig, the governor 18 signals the compressor to unload via line 21 and at the same time signals the purge valve to open via line 27. The pressure from line 27 enters port 74 and moves piston 63 to the right (as shown in FIG. 2). This allows the internal pressure in the sump 54 to open valve 66 to suddenly exhaust the plenum volume 48, the desiccant volume 41, the filter volume 55 and the sump volume 54. The air in the purge volume 52 being restricted by small passage 50, expands and slowly migrates through the desiccant removing moisture and escapes through valve 66. Spring 80 is designed so that at a given pressure, say 25 psig, it forces valve 66 to seal at its seat 70, thus maintaining a pressure of 25 psi within the dryer.

With prior art purge valve constructions, the valves would continuously discharge purge air to the atmosphere during the unloading cycle irrespective of the pressure of the purge air. This resulted in loss of engine efficiency when the air brake system was utilized with supercharged or turbocharged engines. With turbocharged engines the intake air from the engine manifold is at a superatmospheric pressure, say 25 psig, and when this supercharged air passed through the air dryer and purge valve without any restriction it was lost to the atmosphere. The loss of air from the engine manifold causes loss of engine power and efficiency.

The present invention overcomes these problems by providing a novel purge valve for use with the air dryer, which valve prevents air flow therethrough below a predetermined pressure. Thus, the novel purge valve according to this invention does not exhaust purge air from the dryer to the atmosphere until the pressure of the purge air exceeds a predetermined pressure which is generally slightly above the pressure of the supercharged air from the engine manifold. Thus, with a turbocharged or supercharged vehicle engine, the air from the engine manifold is not lost. Accordingly, the novel purge valve of this invention is constructed to remain closed and prevent purge air exhausting to the atmosphere at pressures below the pressure of the engine manifold intake air pressure. In this way, supercharged air from the air manifold of a turbocharged engine is not permitted during the unloading cycle of the compressor to flow freely through the air dryer and exhaust to the atmosphere so as to pull air from the engine thereby reducing engine efficiency and power.

FIGS. 2 through 5 of the drawing illustrate a preferred form of an air dryer purge valve in accordance with this invention. Referring more specifically to the drawings, the novel purge valve 26 comprises valve housing 60 sealably fitted to the air dryer. Capscrew 61 secures spring retainer 59 in place. The valve housing is provided with a centrally located stepped bore 63, the rear portion 63A of which is of greater diameter than the forward portion. Piston 62 is adapted for slidable movement within the bore 63. The rear portion 62A of the piston is of reduced diameter and has an elongated slot portion 64 adjacent thereto. Nut 65 retains the valve seal 66 on the seal retainer 67 which is slidably received in the central portion of the piston. A cross pin 68 is attached to the intermediate portion of the seal retainer 67 and is positioned for limited reciprocal movement in the elongated slot portion 64 of the piston. The valve housing is also provided with valve seat 70.

A semi-annular purge air inlet port 72 provides fluid communication between the interior of the air dryer and valve bore space 63A at the rear end of piston 62. Unloading air inlet port 74 is provided in the housing to provide communication between the purge valve 26 and the governor 18 by means of air line 27 (see FIG. 1). Port 74 leads to air cavity 75 which communicates with bore 63. Air inlet ports 72 and 74 are disposed on opposite sides of the piston 62, i.e., air inlet port 72 which communicates with the interior of the dryer is disposed rearwardly of the piston 62 while the unloading air inlet port is disposed forwardly of the head of piston 62. Exhaust port 76 in the valve housing permits air to be exhausted from the air dryer to the atmosphere. Compression spring 80 resiliently biases the valve seal 66 (to the left in the drawing) into sealing engagement with valve seat 70.

FIG. 2 shows the operating elements of the novel purge valve 26 as assembled and installed in the dryer. No gas pressure is acting on either side of piston 62 and valve seal 66 is seated on valve seat 70 by means of the biasing force of spring 80.

Figure 3:
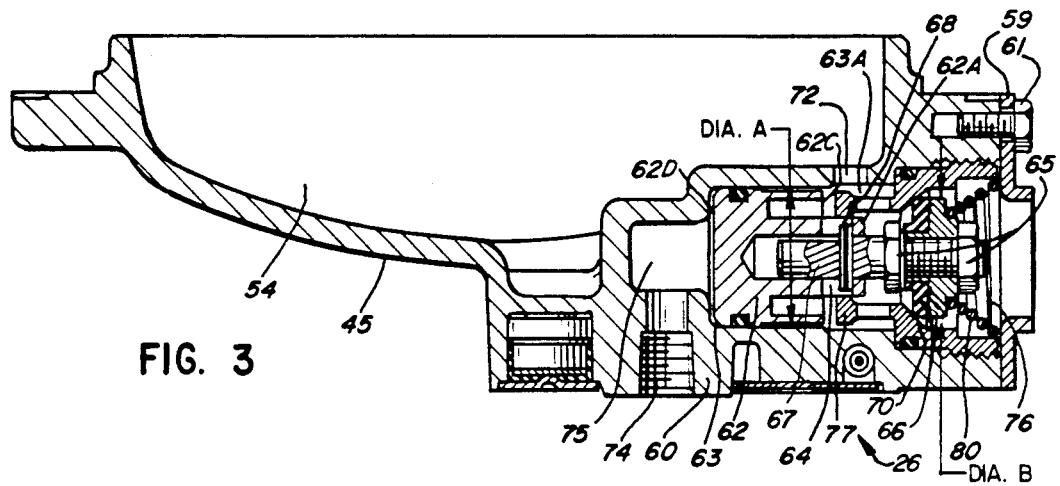
FIG. 3 is a cross-sectional view of the air purge valve of the invention showing the position of the valve-operating elements during one stage of operation of the compressor.

FIG. 3 shows the positioning of the purge valve operating elements when the braking system is activated and the air compressor is in the normal or loading mode. The gas pressure in the air dryer is above 0 and is increasing but is below the minimum air pressure required in the air reservoir. During the loading mode, the pressure at the unloading air inlet port 74 is 0. Under these conditions, charged or pressurized air from the dryer enters the purge valve through inlet port 72 and acts on the rear face 62C of piston 62 to force the piston inwardly (to the left in the drawing). When the piston 62 moves inwardly, the rear portion of the piston 62A exerts a pulling force on cross pin 68. The diameter A of the rear face 62C of the piston is greater than the outside diameter B of valve seal 66. The difference in force acting on rear face 62C (diameter A) of piston 62 and the force acting on diameter B of valve seal 66 plus the inwardly biasing force of spring 80 holds the valve seal 66 tightly against valve seat 70. Thus, inward movement of the piston and cross pin 68 further enhances seating of valve 66 on valve seat 70 permitting no air to exhaust from the dryer through exhaust port 76.

Figure 4:
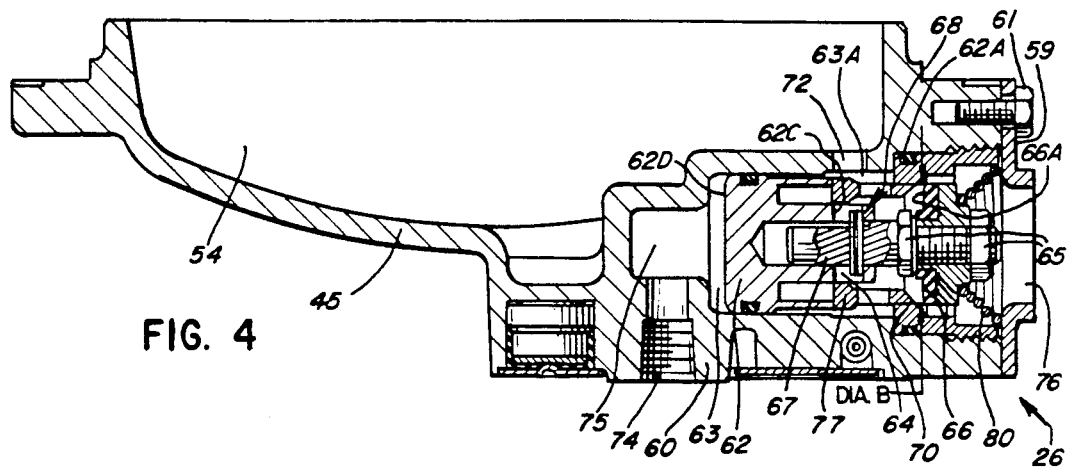
FIG. 4 is a cross-sectional view of the air purge valve of the invention showing the position of the valve-operating elements during another stage of operation of the compressor.

The elements of the purge valve 26 remain in this closed position (FIG. 3) until the maximum required air pressure, say about 120 psig, is reached in the system, at which time the compressor controlled by the governor switches to the unloading mode of operation. At this time the air pressure in the dryer (and at inlet port 72) is at the required pressure of say 120 psig and the pressure in the unloading air inlet port 74 reaches the same pressure by means of pressurizing line 27 from the governor. As the gas pressure at the unloading air inlet port 74 builds up in cavity 75 it exerts force on face 62D of the piston 62 forcing the piston rearwardly (to the right in the drawing) against valve stop 77. It also removes the pulling force on the cross pin 68. Also, the pressure in the dryer and inlet port 72 (initially 120 psi) acts on face 66A of valve seal 66. The internal pressure of the air dryer, that is the force acting on face 66A of valve seal 66, overcomes the biasing force of spring 80 permitting purging of the dryer. FIG. 4 shows the position of the valve elements under these conditions. Purging of gas pressure in the dryer continues until a balance is attained between the internal pressure of the dryer and the load or biasing force of spring 80. Thus, the dryer is purged of air until the pressure in the dryer falls to a predetermined value, say 25 psig which is set to be the same as the pressure in the engine intake manifold.

Figure 5:
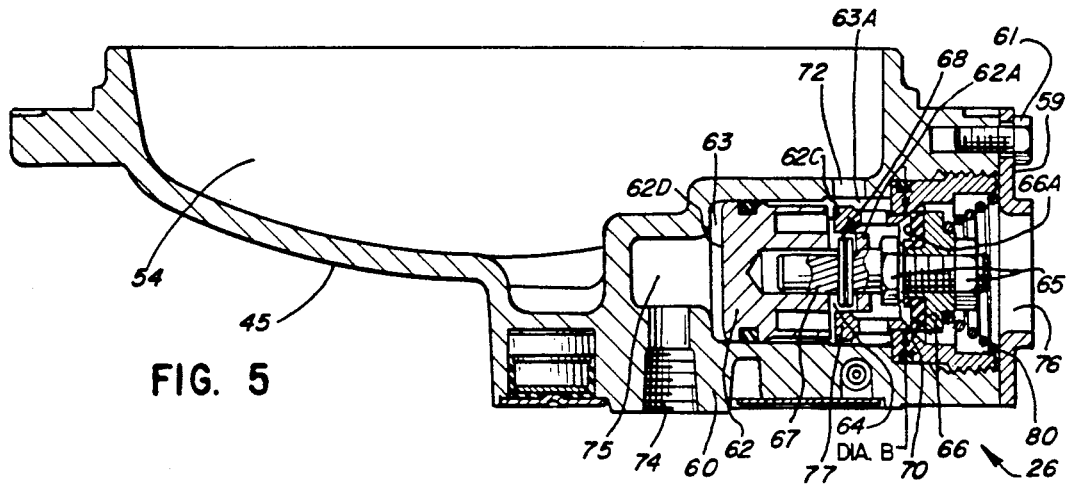
FIG. 5 is a cross-sectional view of the air purge valve of the invention showing the position of the valve-operating elements during still another stage of operation of the compressor.

FIG. 5 shows the position of the valve elements with the compressor still in the unload mode and when the air has just been purged from the dryer. Under these conditions the gas pressure in the dryer and inlet port 72 is say about 25 psig, which approximates the pressure of the intake air from the engine manifold and the pressure at unloading air inlet port 74 is say 120 psig. The pressure in the air dryer (say 25 psig) has fallen to a level insufficient to overcome the biasing action of spring 80 which maintains the valve 66 against seat 70 thus preventing air from exhausting from the purge valve to the atmosphere. When the compressor switches back to the loading cycle, the pressure at the unloading inlet port 74 becomes 0 and the valve elements assume the position shown in FIG. 3 of the drawings.

Those modifications and equivalents which fall within the spirit of the invention are to be considered a part thereof.

What is claimed is:

1. In a governor-controlled gas compressor system for maintaining gas pressure in a gas reservoir between a predetermined first pressure level at which said compressor commences to compress pressurizing intake gas from a supercharged source thereof and a predetermined higher second pressure level at which the compressor ceases to compress said gas, said system including a source of supercharged gas, a gas compressor, a governor and a gas dryer vessel intermediate said compressor and said reservoir to effect drying of the compressed gas, the said gas dryer vessel being provided with gas inlet means in communication with said compressor, and gas outlet means in communication with said reservoir, and a purge valve for exhausting purge gas therefrom, and having a drying chamber therein having a desiccant material disposed therein and a purge air chamber in communication with said drying chamber, the improvement which consists in pressure retention means within said purge valve to control exhausting purge gas therefrom only when the pressure of the purge gas in said pressure retention means exceeds the pressure of the pressurized intake gas from the supercharged source thereof.

2. A system in accordance with claim 1 wherein the purge valve comprises:
   (a) a valve body having a bore therein;
   (b) a piston movable within said bore;
   (c) a first inlet port in said valve body providing fluid communication between said gas dryer vessel and the valve bore on one side of said piston;
   (d) a second inlet port in said valve body providing fluid communication between said governor and the valve bore on the other side of said piston;
   (e) an outlet port in said valve body providing fluid communication between the valve bore on one side of said piston to atmospheric pressure; and
   (f) sealing means between the valve bore on one side of said piston and said outlet port, said sealing means being biased to the valve closing position but being responsive to pressure on each side of said piston so as to open and discharge purge gas from the dryer vessel only when said compressor ceases to compress and the pressure of purge gas being discharged to the atmosphere exceeds that of the pressurized intake gas from the supercharged source thereof and to return to the valve closing position when said compressor again commences to compress.

3. In a pneumatic braking system for vehicles equipped with a supercharged internal combustion engine wherein a governor controls an air compressor for maintaining air pressure in an air reservoir between a predetermined first pressure level at which said compressor commences to compress pressurized intake air from a supercharged source thereof and a predetermined higher second pressure level at which the compressor ceases to compress said air, said system including a source of supercharged air, an air compressor and a governor and an air dryer vessel intermediate said compressor and said reservoir to effect drying of the compressed air, the said air dryer vessel being provided with air inlet means in communication with said compressor, and air outlet means in communication with said reservoir, and a purge valve for exhausting purge air therefrom, and having a drying chamber therein having a desiccant material disposed therein and a purge air chamber in communication with said drying chamber, the improvement which consists in pressure retention means within said purge valve to control exhausting purge air therefrom only when the pressure of the purge air in said pressure retention means exceeds the pressure of the pressurized intake air from the supercharged source thereof.

4. A system in accordance with claim 3 wherein the purge valve comprises:
   (a) a valve body having a bore therein;
   (b) a piston movable within said bore;
   (c) a first inlet port in said valve body providing fluid communication between said air dryer vessel and the valve bore on one side of said piston;
   (d) a second inlet port in said valve body providing fluid communication between said governor and the valve bore on the other side of said piston;
   (e) an outlet port in said valve body providing fluid communication between the valve bore on one side of said piston to atmospheric pressure; and
   (f) sealing means between the valve bore on one side of said piston and said outlet port, said sealing means being biased to the valve closing position but being responsive to pressure one each side of said piston so as to open and discharge purge air from the dryer vessel only when said compressor ceases to compress and the pressure of purge air being discharged to the atmosphere exceeds that of the pressurized intake air from the supercharged source thereof and to return to the valve closing position when said compressor again commences to compress.

* * * * *